United States Patent
Hong (10) Patent No.: US 10,151,424 B2
(45) Date of Patent: Dec. 11, 2018

(54) APPARATUS FOR SUPPORTING FLEXIBLE DISPLAY PANEL

(71) Applicant: Samsung Display Co., Ltd., Yongin-si, Gyeonggi-do (KR)

(72) Inventor: Sung Su Hong, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/918,079

(22) Filed: Oct. 20, 2015

(65) Prior Publication Data

US 2016/0198579 A1  Jul. 7, 2016

(30) Foreign Application Priority Data

Jan. 5, 2015 (KR) .................. 10-2015-0000719

(51) Int. Cl.
| | |
|---|---|
| *E05D 7/00* | (2006.01) |
| *G06F 1/16* | (2006.01) |
| *F16M 13/00* | (2006.01) |
| *E05D 3/06* | (2006.01) |
| *G09F 9/30* | (2006.01) |
| *F16M 11/12* | (2006.01) |

(Continued)

(52) U.S. Cl.
CPC ............... *F16M 13/00* (2013.01); *E05D 3/06* (2013.01); *E05D 7/00* (2013.01); *F16M 11/12* (2013.01); *F16M 11/2035* (2013.01); *F16M 11/38* (2013.01); *F16M 11/40* (2013.01); *G06F 1/1601* (2013.01); *G09F 9/301* (2013.01); *F16M 2200/08* (2013.01)

(58) Field of Classification Search
CPC ...... H04M 1/0222; H04M 1/02; F16M 13/00; H05K 5/0017; E05D 3/06; E05D 7/00; E05D 11/06; E05D 11/10; E05D 3/10; H04B 1/38
USPC ...................... 305/47; 16/225, 369, 367, 368
See application file for complete search history.

(56) References Cited

U.S. PATENT DOCUMENTS 3,104,113 A * 9/1963 Montz ....................... B62B 5/02
                                                       280/5.22
5,337,452 A * 8/1994 LeBlanc ................... E05D 3/10
                                                       16/224

(Continued)

FOREIGN PATENT DOCUMENTS

| KR | 10-1029935 B1 | 4/2011 |
| KR | 10-1346146 B1 | 12/2013 |

*Primary Examiner* — Emily M Morgan
(74) *Attorney, Agent, or Firm* — Lewis Roca Rothgerber Christie LLP (57) ABSTRACT

An apparatus for supporting a flexible display panel is disclosed. In one aspect, the apparatus includes first and second unidirectional link members arranged in a first direction so as to be parallel to each other. The first and second unidirectional link members are connected to each other so as to be rotatable around a second direction crossing the first direction. The apparatus also includes a first connecting member connected to one side of each of the first and second unidirectional link members so as to be rotatable around the second direction and first and second supporting plates arranged on opposing sides of the first and second unidirectional link members in the first direction. The first and second supporting plates are configured to be rotatable together with the first and second unidirectional link members.

15 Claims, 9 Drawing Sheets

(51) Int. Cl.
*F16M 11/20* (2006.01)
*F16M 11/38* (2006.01)
*F16M 11/40* (2006.01)

(56) References Cited

U.S. PATENT DOCUMENTS

| | | | | |
|---|---|---|---|---|
| 6,223,393 | B1* | 5/2001 | Knopf | G06F 1/1681 16/366 |
| 6,377,324 | B1* | 4/2002 | Katsura | G02F 1/133305 349/58 |
| 8,046,871 | B2* | 11/2011 | Yamauchi | B60B 33/0007 16/45 |
| 8,196,939 | B2* | 6/2012 | Bustle | A47B 21/0314 280/47.35 |
| 8,369,075 | B2* | 2/2013 | Huang | G09F 9/33 248/297.21 |
| 2012/0044620 | A1* | 2/2012 | Song | G06F 1/1616 361/679.01 |
| 2012/0307423 | A1 | 12/2012 | Bohn et al. | |
| 2013/0214577 | A1* | 8/2013 | Mojtabavi | A47B 3/08 297/331 |
| 2014/0126133 | A1* | 5/2014 | Griffin | G06F 1/1652 361/679.27 |
| 2014/0196254 | A1* | 7/2014 | Song | E05D 3/14 16/302 |
| 2014/0226275 | A1* | 8/2014 | Ko | G06F 1/1626 361/679.27 |
| 2015/0176317 | A1* | 6/2015 | Lee | E05D 3/06 16/251 |
| 2015/0277506 | A1* | 10/2015 | Cheah | G06F 1/1681 361/679.27 |
| 2016/0139634 | A1* | 5/2016 | Cho | G06F 1/1652 361/679.27 |
| 2016/0215541 | A1* | 7/2016 | Tazbaz | E05D 3/14 |
| 2016/0324023 | A1* | 11/2016 | Kim | H05K 5/0217 |

\* cited by examiner

APPARATUS FOR SUPPORTING FLEXIBLE DISPLAY PANEL

CROSS-REFERENCE TO RELATED APPLICATION

This application claims priority to and the benefit of Korean Patent Application No. 10-2015-0000719 filed in the Korean Intellectual Property Office on Jan. 5, 2015, the entire contents of which are incorporated herein by reference.

BACKGROUND

Field

The described technology generally relates to an apparatus for supporting a flexible display panel.

Description of the Related Technology

Examples of display devices which are currently known include liquid crystal displays (LCDs), plasma display panels (PDPs), organic light-emitting diode (OLED) displays, field effect displays (FEDs), electrophoretic displays, and the like.

OLED displays include two electrodes and an organic light-emitting layer interposed between the two electrodes. Electrons injected from one electrode and holes injected from the other electrode are recombined in the organic light-emitting layer so as to form excitons and the excitons emit energy in the form of light.

Since OLED displays have self-luminance characteristics and do not require a separate light source in contrast to LCDs, the thickness and weight of OLED displays can be comparatively lower. In addition, since OLED displays have high quality characteristics such as low power consumption, high luminance, fast response speeds, and the like, they have been regarded as next generation displays.

SUMMARY OF CERTAIN INVENTIVE ASPECTS

One inventive aspect is an apparatus for supporting a display panel of a flexible display that can enable the display panel to be bent or folded.

Another aspect is a display panel including: first and second unidirectional link members arranged in a first direction so as to be parallel to each other and connected to each other so as to be rotatable around a second direction which is perpendicular to the first direction; a first connecting member connected to one side of each of the first and second unidirectional link members so as to be rotatable; and first and second supporting plates arranged on one side of each of the first and second unidirectional link members in the first direction so as to be rotatable together with the first and second unidirectional link members, respectively.

The apparatus can further include: a first rotation axis penetrating through the first unidirectional link member and the first connecting member and being parallel to the second direction; and a second rotation axis penetrating through the second unidirectional link member and the first connecting member and being parallel to the first rotation axis.

The first and second unidirectional link members can be rotatable in only an upper side direction around each of the first and second rotation axes based on a plane formed by the first and second unidirectional link members.

The first and second unidirectional link members can be formed in a square pillar shape, and upper corner portions of the first and second unidirectional link members facing each other can be formed in a chamfered shape.

The corner portions of the first and second unidirectional link members can be in contact with each other where the first and second unidirectional link members are rotated around the first and second rotation axes, respectively.

The first unidirectional link member can be fixed to the first supporting plate.

The second unidirectional link member can be fixed to the second supporting plate.

The display panel can be positioned on the first and second supporting plates.

The apparatus can further include: first and second bidirectional link members arranged in the first direction so as to be parallel to each other and connected to each other so as to be rotatable around the second direction; and third and fourth bidirectional link members arranged in the first direction so as to be parallel to each other and connected to each other so as to be rotatable around the second direction, wherein the first and third bidirectional link members are arranged in the second direction so as to be parallel to each other and are connected to each other so as to be rotatable around the first direction; the second and fourth bidirectional link members are arranged in the second direction so as to be parallel to each other and are connected to each other so as to be rotatable around the first direction; the first bidirectional link member and the first unidirectional link member are arranged in the second direction so as to be parallel to each other and are connected to each other so as to be rotatable around the first direction; and the second bidirectional link member and the second unidirectional link member are arranged in the second direction so as to be parallel to each other and are connected to each other so as to be rotatable around the first direction.

The first rotation axis can penetrate through the first and third bidirectional link members, and the second rotation axis can penetrate through the second and fourth bidirectional link members.

The first and second rotation axes can have elasticity.

The apparatus can further include a third rotation axis penetrating through the first and second bidirectional link members and being parallel to the first direction; and a fourth rotation axis penetrating through the third and fourth bidirectional link members and being parallel to the third rotation axis.

The first and second bidirectional link members can be rotatable in only an upper side direction around each of the first and second rotation axes based on a plane formed by the first and second bidirectional link members.

The third and fourth bidirectional link members can be rotatable in only an upper side direction around each of the first and second rotation axes based on a plane formed by the third and fourth bidirectional link members.

The first and third bidirectional link members can be rotatable in only an upper side direction around each of the third and fourth rotation axes based on a plane formed by the first and third bidirectional link members.

The second and fourth bidirectional link members can be rotatable in only an upper side direction around each of the third and fourth rotation axes based on a plane formed by the second and fourth bidirectional link members.

The first to fourth bidirectional link members can be formed in a square pillar shape, and corner portions of the first to fourth bidirectional link members facing each other can be formed in a chamfered shape.

The third and fourth rotation axes can have elasticity.

Another aspect is an apparatus for supporting a flexible display panel, comprising first and second unidirectional link members arranged in a first direction so as to be parallel to each other, wherein the first and second unidirectional link members are connected to each other so as to be rotatable around a second direction crossing the first direction; a first connecting member connected to one side of each of the first and second unidirectional link members so as to be rotatable around the second direction; and first and second supporting plates arranged on opposing sides of the first and second unidirectional link members in the first direction, wherein the first and second supporting plates are configured to be rotatable together with the first and second unidirectional link members.

In exemplary embodiments, the apparatus further comprises a first rotation rod penetrating through the first unidirectional link member and the first connecting member, wherein the first rotation rod is parallel to the second direction; and a second rotation rod penetrating through the second unidirectional link member and the first connecting member, wherein the second rotation rod is parallel to the first rotation rod. The first and second unidirectional link members can be configured to be rotatable in only an upper direction around each of the first and second rotation rods. Each of the first and second unidirectional link members can have a square pillar shape and upper corner portions of each of the first and second unidirectional link members facing each other can have a chamfered shape.

In exemplary embodiments, the corner portions of the first and second unidirectional link members contact each other when the first and second unidirectional link members are rotated around the first and second rotation rods. The first unidirectional link member can be fixed to the first supporting plate. The second unidirectional link member can be fixed to the second supporting plate. The display panel can be positioned on the first and second supporting plates.

In exemplary embodiments, the apparatus further comprises first and second bidirectional link members arranged in the first direction so as to be parallel to each other, wherein the first and second bidirectional link members are connected to each other so as to be rotatable around the second direction; and third and fourth bidirectional link members arranged in the first direction so as to be parallel to each other, wherein the third and fourth bidirectional link members are connected to each other so as to be rotatable around the second direction, wherein the first and third bidirectional link members are arranged in the second direction so as to be parallel to each other, wherein the first and third bidirectional link members are connected to each other so as to be rotatable around the first direction, wherein the second and fourth bidirectional link members are arranged in the second direction so as to be parallel to each other, wherein the second and fourth bidirectional link members are connected to each other so as to be rotatable around the first direction, wherein the first bidirectional link member and the first unidirectional link member are arranged in the second direction so as to be parallel to each other, wherein the first bidirectional link member and the first unidirectional link member are connected to each other so as to be rotatable around the first direction, wherein the second bidirectional link member and the second unidirectional link member are arranged in the second direction so as to be parallel to each other, and wherein the second bidirectional link member and the second unidirectional link member are connected to each other so as to be rotatable around the first direction.

In exemplary embodiments, the first rotation rod penetrates through the first and third bidirectional link members, and wherein the second rotation rod penetrates through the second and fourth bidirectional link members. The first and second rotation rods can be elastic. The apparatus can further comprise a third rotation rod penetrating through the first and second bidirectional link members, wherein the third rotation rod is parallel to the first direction and a fourth rotation rod penetrating through the third and fourth bidirectional link members, wherein the fourth rotation rod is parallel to the third rotation rod.

In exemplary embodiments, the first and second bidirectional link members are configured to be rotatable in only an upper side direction around each of the first and second rotation rods. The third and fourth bidirectional link members can be configured to be rotatable in only an upper side direction around each of the first and second rotation rods. The first and third bidirectional link members can be configured to be rotatable in only an upper side direction around each of the third and fourth rotation rods. The second and fourth bidirectional link members can be configured to be rotatable in only an upper side direction around each of the third and fourth rotation rods. The first to fourth bidirectional link members can be formed to have a square pillar shape and corner portions of the first to fourth bidirectional link members facing each other can be formed to have a chamfered shape. The third and fourth rotation rods can be elastic.

According to at least one embodiment, the display panel can be freely folded or bent in the first direction and the second direction, that is, in both directions.

DETAILED DESCRIPTION OF CERTAIN INVENTIVE EMBODIMENTS

Exemplary embodiments will be described in detail with reference to the accompanying drawings. However, the described technology is not limited to the exemplary embodiments which are described herein, and may be modified in various different ways. Rather, the exemplary embodiments to be described below are provided so that the spirit and scope of the described technology is sufficiently disclosed such that those skilled in the art to which the described technology pertains can practice the described technology.

In the drawings, the thicknesses of layers and regions may be exaggerated for the sake of clarity. In addition, when a layer is described as being 'on' another layer or a substrate, the layer can be directly formed on the other layer or substrate or additional layers can be interposed therebetween. Like elements will be denoted by like reference numerals throughout the specification.

Figure 1:
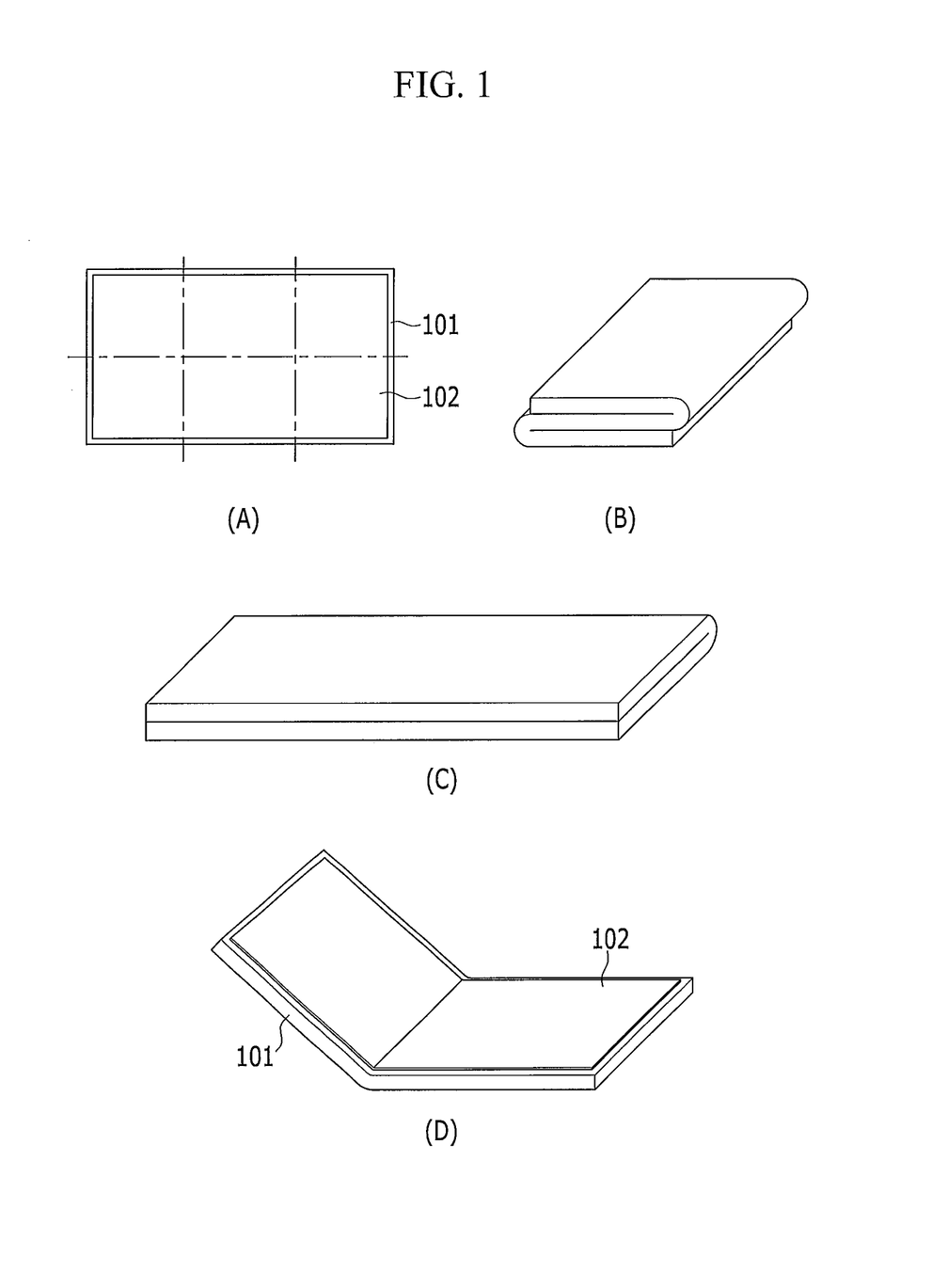
FIG. 1 shows a display device that can be folded in various forms.

Flexible displays (typically of the OLED type) which can be bent or folded have been developed. FIG. 1 illustrates a flexible display folded in a number of different configurations. Flexible displays can also include a support 101 to give the display structure (e.g., a flexible display panel 102). In order to allow the display panel 102 of a flexible display to be bent or folded, the support 101 should also be bent or folded along with the display panel.

Figure 2:
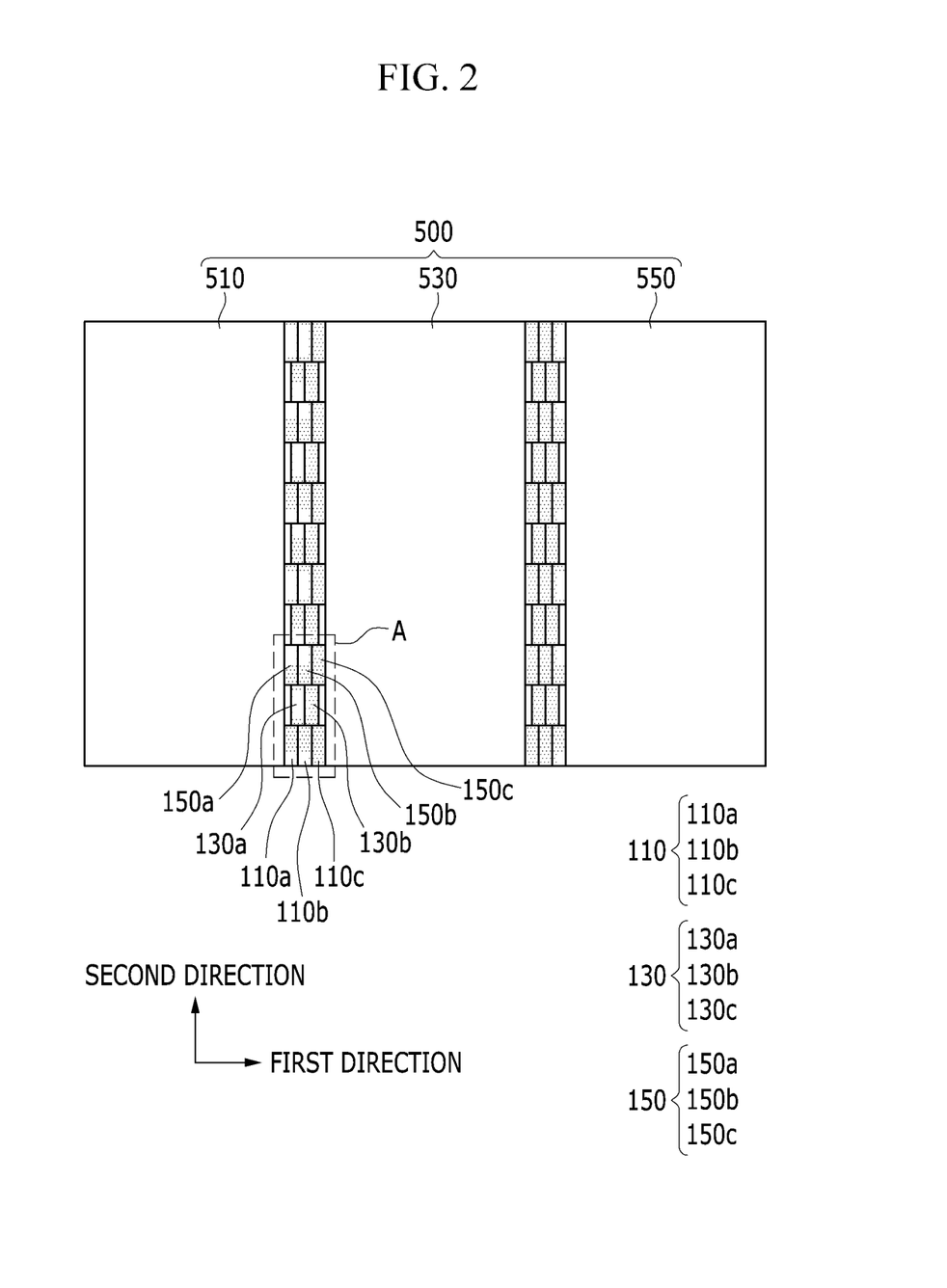
FIG. 2 is a plan view showing a supporting apparatus of a display panel according to a first exemplary embodiment.
Figure 3:
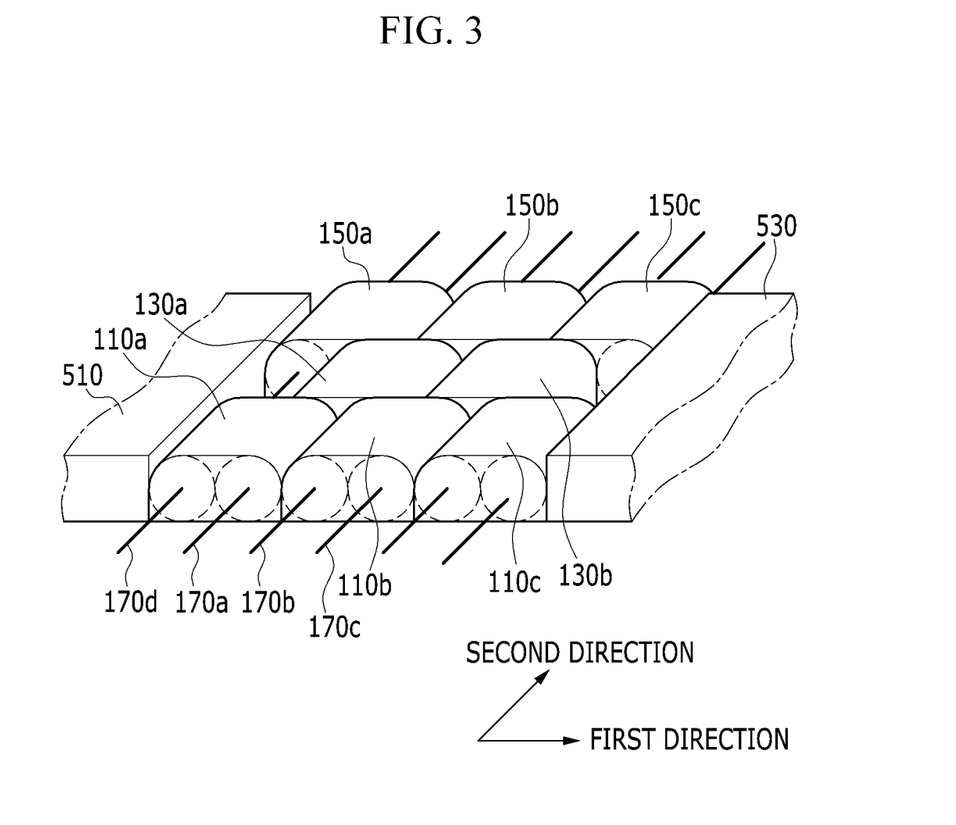
FIG. 3 is an enlarged perspective view of region A of FIG. 2.
Figure 4:
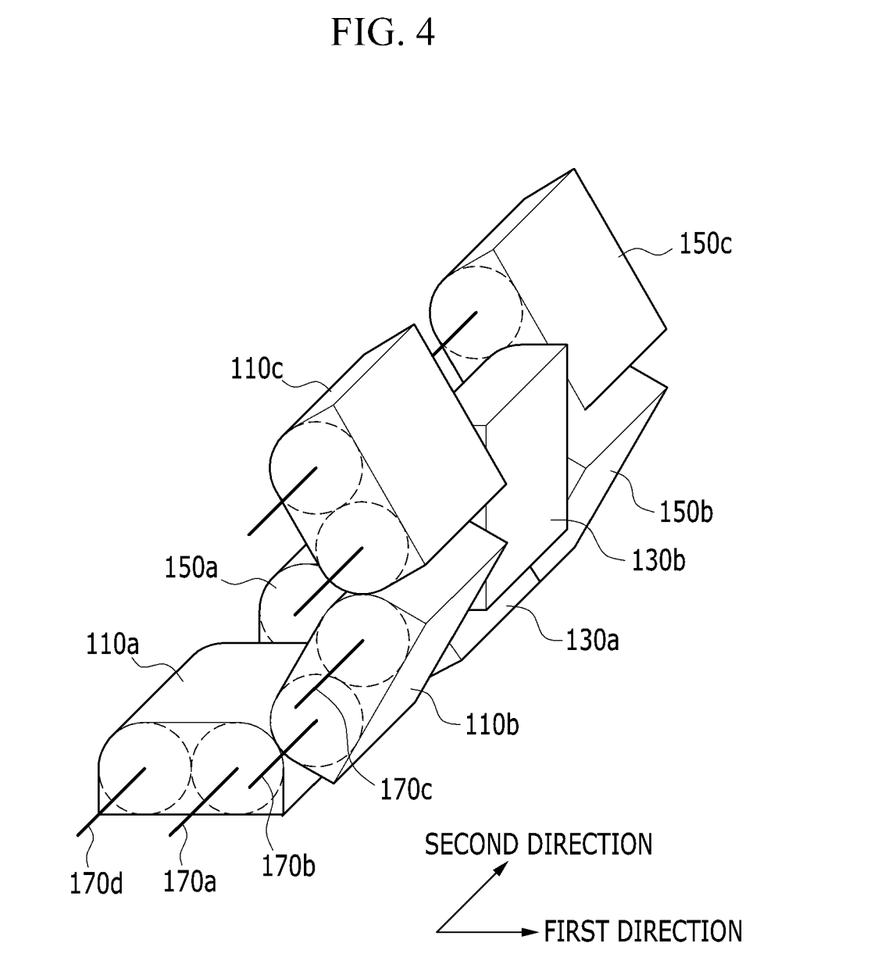
FIG. 4 is a drawing showing operations of first and second unidirectional link members.

Referring to FIGS. 2 to 4, an apparatus for supporting a display panel according to a first exemplary embodiment can bend or fold the display panel around a second direction.

Referring to FIG. 2, the apparatus for supporting the display panel according to a first exemplary embodiment can rotate first and second supporting plates 510 and 530 by first to third unidirectional link members 110a, 110b, and 110c positioned between the first supporting plate 510 and the second supporting plate 530.

In addition, similar unidirectional link members to the first to third unidirectional link members 110a, 110b, and 110c can be positioned between the second and third supporting plates 530 and 550. As a result, the second and third supporting plates 530 and 550 can be rotated.

That is, the first and second supporting plates 510 and 530 can be folded so as to face each other by the first to third unidirectional link members 110a, 110b, and 110c.

In addition, the second and third supporting plates 530 and 550 can be folded so as to face each other by the unidirectional link members interposed between the second supporting plate 530 and the third supporting plate 550.

Hereinafter, the first to third unidirectional link members 110a, 110b, and 110c that can fold the first and second supporting plates 510 and 530 or the second and third supporting plates 530 and 550 so as to face each other will be described.

FIG. 3 is an enlarged perspective view of region A of FIG. 2.

Referring to FIG. 3, the first to third unidirectional link members 110a, 110b, and 110c, and first and second connecting members 130a and 130b are positioned between the first and second supporting plates 510 and 530. The first and second supporting plates 510 and 530 can be bent or folded while being rotated in one direction by the relative rotation of the first to third unidirectional link members 110a, 110b, and 110c, and first and second connecting members 130a and 130b.

As shown in FIG. 3, the first to third unidirectional link members 110a, 110b, and 110c are arranged in a first direction so as to be parallel to each other. The first to third unidirectional link members 110a, 110b, and 110c are connected to each other so as to be rotatable around a second direction. In the embodiment of FIG. 3, the second direction is a direction which is perpendicular to the first direction. However, in other embodiments, the second direction is not necessarily perpendicular to the first direct, but crosses the first direction.

The first connecting member 130a is connected to one side of the first and second unidirectional link members 110a and 110b. The first and second unidirectional link members 110a and 110b are connected to the first connecting member 130a so as to be rotatable.

In addition, the second connecting member 130b is connected to one side of the second and third unidirectional link members 110b and 110c. The second and third unidirectional link members 110b and 110c are connected to the second connecting member 130b so as to be rotatable.

As a result, the second unidirectional link member 110b is connected to the first and second connecting members 130a and 130b so as to be rotatable.

In addition, a first rotation axis 170a penetrates through the first unidirectional link member 110a and the first connecting member 130a. The first rotation axis 170a is parallel to the second direction. Although the term rotation axis is used herein, in some embodiments, each of the rotation axes is implemented via a rotation rod or a rotation pin.

Consequently, the first unidirectional link member 110a and the first connecting member 130a can be rotated around the first rotation axis 170a.

Meanwhile, a second rotation axis 170b penetrates through the second unidirectional link member 110b and the first connecting member 130a. Similarly, the second rotation axis 170b is parallel to the second direction.

Thus, the second unidirectional link member 110b and the first connecting member 130a can be rotated around the second rotation axis 170b.

In addition, a 2-1-th rotation axis 170c penetrates through the second unidirectional link member 110b and the second connecting member 130b. Similarly, the 2-1-th rotation axis 170c is also parallel to the second direction.

In addition, a 1-1-th rotation axis 170d penetrates through the first and fourth unidirectional link members 110a and 150a together with the first rotation axis 170a. As shown in FIG. 3, however, the 1-1-th rotation axis 170d does not penetrate through the first connecting member 130a.

Meanwhile, fourth to sixth unidirectional link members 150a, 150b, and 150c are positioned on the opposing side of the first and second connecting members 130a and 130b with respect to the first to third unidirectional link members 110a, 110b, and 110c. As shown in FIG. 3, the fourth to sixth unidirectional link members 150a, 150b, and 150c are connected to the first and second connecting members 130a and 130b, similar to the first to third unidirectional link members 110a, 110b, and 110c.

The first rotation axis 170a described above penetrates through the first and fourth unidirectional link members 110a and 150a and the first connecting member 130a. In addition, the second rotation axis 170b penetrates through the second and fifth unidirectional link members 110b and 150b and the first connecting member 130a. The 2-1-th rotation axis 170c penetrates through the second and fifth unidirectional link members 110b and 150b and the second connecting member 130b.

In addition to this, the rotation axis penetrates through the third and sixth unidirectional link members 110c and 150c and the second connecting member 130b.

Referring to FIGS. 2 and 3, the first and fourth unidirectional link members 110a and 150a are connected to the first supporting plate 510. The third and sixth unidirectional link members 110c and 150c are connected to the second supporting plate 530. That is, the first to third unidirectional link members 110a, 110b, and 110c, and the fourth to sixth unidirectional link members 150a, 150b, and 150c are interposed between the first and second supporting plates 510 and 530.

Accordingly, the first and second supporting plates 510 and 530 are fixedly connected to the unidirectional link members.

Meanwhile, as shown in FIG. 2, the apparatus further includes a third supporting plate 550. Similar unidirectional link members to the unidirectional link members interposed between the first and second supporting plates 510 and 530 are also be interposed between the second and third supporting plates 530 and 550.

The first to third supporting plates 510, 530, and 550 support a display panel (not shown). The display panel (not shown) is arranged on the first to third supporting plates 510, 530, and 550.

At least one of the first and second supporting plates 510 and 530 connected to each other by the first to third unidirectional link members 110*a*, 110*b*, and 110*c* can be rotated around the second direction, thereby making it possible for the display panel (not shown) arranged on the first and second supporting plates 510 and 530 to be folded or bent.

In addition, at least one of the second and third supporting plates 530 and 550 connected to each other by the fifth to sixth unidirectional link members 150*a*, 150*b*, and 150*c* can be rotated around the second direction, thereby making it possible for the display panel (not shown) arranged on the second and third supporting plates 530 and 550 to be folded or bent.

As shown in FIGS. 2 and 3, the first to third supporting plates 510, 530, and 550 are interposed in the first direction so as to be parallel to each other.

In describing the apparatus for supporting the display panel according to the first exemplary embodiment, an embodiment in which three unidirectional link members are arranged in the first direction between the first and second supporting plates 510 and 530 is described. That is, the first to third unidirectional link members 110*a*, 110*b*, and 110*c*, and the fourth to sixth unidirectional link members 150*a*, 150*b*, and 150*c* are interposed between the first and second supporting plates 510 and 530 in the embodiment described in connected with FIGS. 2 and 3.

However, the apparatus for supporting the display panel according to the first exemplary embodiment is not limited thereto. For example, in other embodiments, only two unidirectional link members such as the first and second unidirectional link members 110*a* and 110*b* are interposed between the first and second supporting plates 510 and 530.

That is, in some embodiments, the apparatus for supporting the display panel according to the first exemplary embodiment includes only at least the first and second unidirectional link members 110*a* and 110*b* between the first and second supporting plates 510 and 530.

In these embodiments, only the first connecting member 130*a* are connected to the first and second unidirectional link members 110*a* and 110*b* so as to be rotatable.

Further, in other embodiments, four or more unidirectional link members can be interposed between the first and second supporting plates 510 and 530. As the number of unidirectional link members interposed between the first and second supporting plates 510 and 530 increases, the radius of the display panel when bent can also increase.

According to the first exemplary embodiment, the first to sixth unidirectional link members 110*a*, 110*b*, 110*c*, 150*a*, 150*b*, and 150*c* can have a square pillar shape.

In this embodiment, the first to sixth unidirectional link members 110*a*, 110*b*, 110*c*, 150*a*, 150*b*, and 150*c* have upper corner portions having a chamfered shape.

Figure 5:
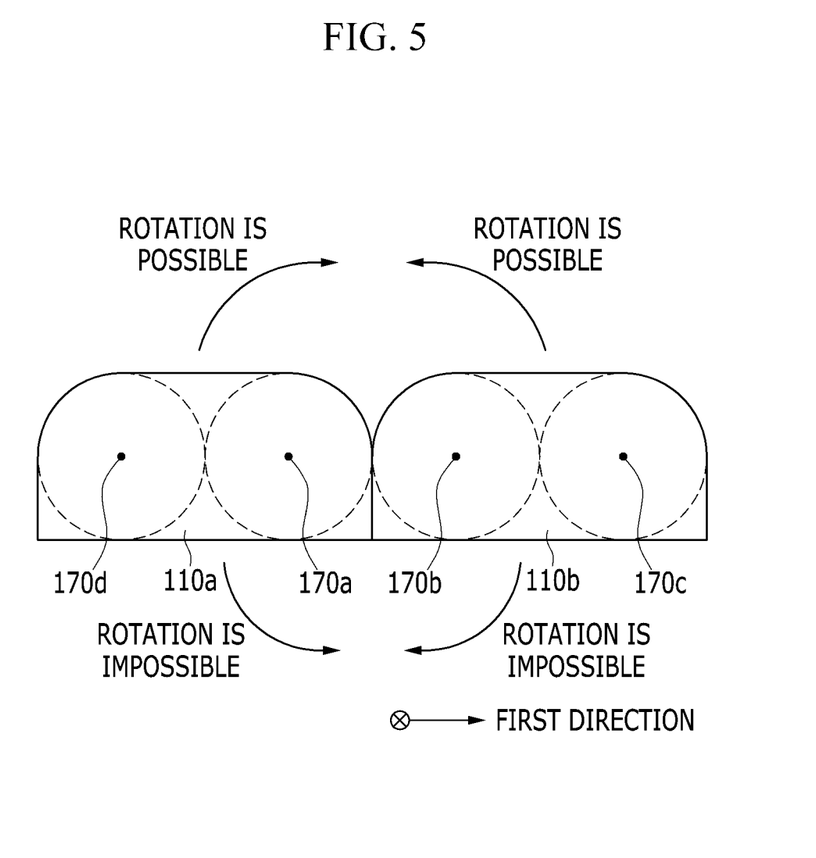
FIG. 5 is a drawing showing rotation directions of the first and second unidirectional link members.

Referring to FIGS. 4 and 5, two upper corner portions of the first to sixth unidirectional link members 110*a*, 110*b*, 110*c*, 150*a*, 150*b*, and 150*c* are formed to have a chamfered shape. Thereby, the corner portions of the first and second unidirectional link members 110*a* and 110*b* facing each other are formed to have the same chamfered shape.

Thereby, for example, when the first or second unidirectional link member 110*a* or 110*b* are rotated around the second direction, the first and second unidirectional link members 110*a* and 110*b* can be rotated while being in contact with each other.

Similarly, when the second or third unidirectional link member 110*b* or 110*c* are rotated around the second direction, the second and third unidirectional link members 110*b* and 110*c* can be rotated while being in contact with each other.

Meanwhile, as shown in FIG. 5, when the first and second unidirectional link members 110*a* and 110*b* are formed to have the above-mentioned shape, when the first or second unidirectional link member 110*a* or 110*b* are rotated around the first or second rotation axis 170*a* or 170*b*, they can be rotated only in one direction.

Referring to FIG. 5, the first and second unidirectional link members 110*a* and 110*b* can be rotated only in an upper direction based on a plane formed by the first and second unidirectional link members 110*a* and 110*b*. That is, the first and second unidirectional link members 110*a* and 110*b* cannot be rotated in a lower direction based on the plane.

Thereby, the apparatus for supporting the display panel according to the first exemplary embodiment can bend or fold the display panel only in one direction while supporting the display panel. However, when the first and second unidirectional link members 110*a* and 110*b* are arranged in an inverted direction with respect to FIG. 5, the apparatus for supporting the display panel can fold or bend the display panel in the lower direction in contrast to the embodiment of FIG. 5.

Meanwhile, in the apparatus for supporting the display panel according to the first exemplary embodiment, the first and second connecting members 130*a* and 130*b* can be formed to have the same shape as the first to sixth unidirectional link members (110*a*, 110*b*, 110*c*, 150*a*, 150*b*, and 150*c*).

Thereby, similar to the first to sixth unidirectional link members (110*a*, 110*b*, 110*c*, 150*a*, 150*b*, and 150*c*) where the first or second connecting member 130*a* or 130*b* can be rotated around the second direction, the first and second connecting members 130*a* and 130*b* can also be rotated while being folded toward each other.

In addition, when the first and second connecting members 130*a* and 130*b* are formed to have the above-mentioned shape and the first or second connecting member 130 or 130*b* is rotated around the second or 2-1-th rotation axis 170*b* or 170*c*, the apparatus can be rotated only in one direction along the first and second connecting members 130*a* and 130*b*.

That is, the first and second connecting members 130*a* and 130*b* can be rotated only in an upper direction based on a plane formed by the first and second connecting members 130*a* and 130*b*. The first and second connecting members 130*a* and 130*b* cannot be rotated in a lower direction based on the plane.

Hereinafter, an apparatus for supporting a display panel according to a second exemplary embodiment will be described with reference to FIGS. 6 to 9. In describing the apparatus for supporting the display panel according to the second exemplary embodiment, a detailed description of the same or similar configuration as the configuration of the apparatus for supporting the display panel according to the first exemplary embodiment will be omitted.

Figure 6:
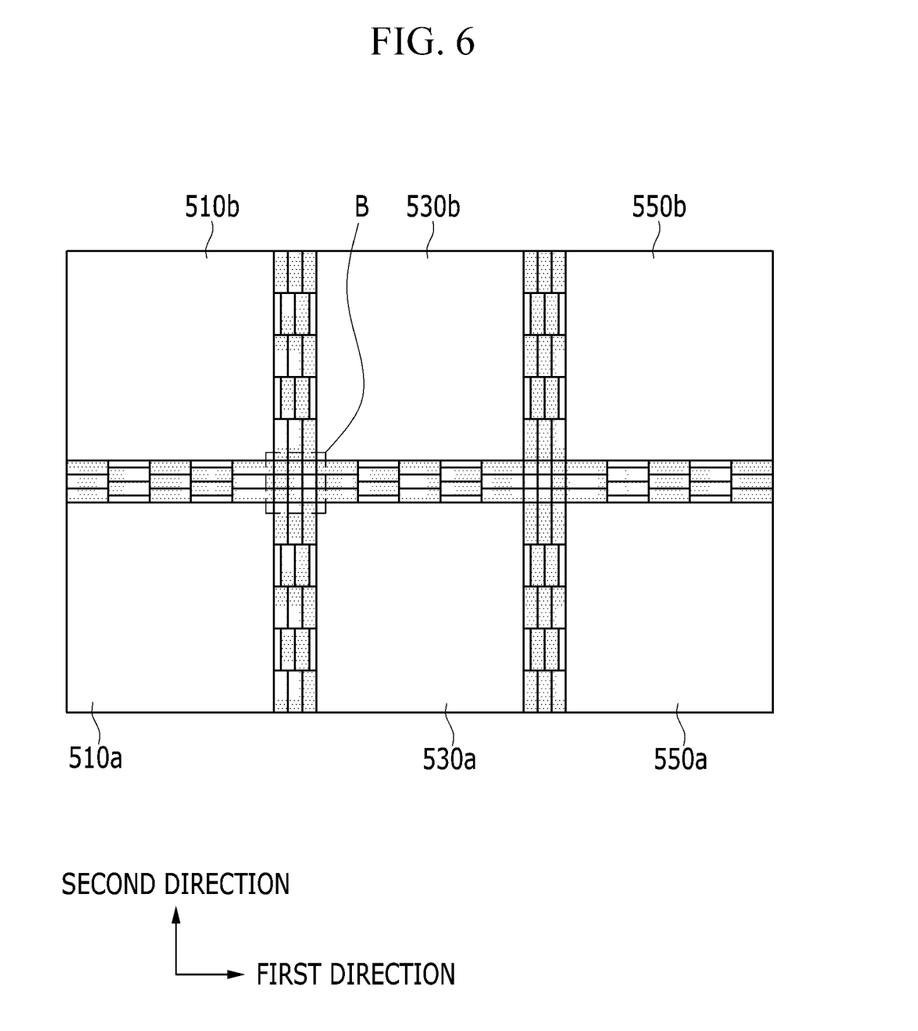
FIG. 6 is a plan view showing a supporting apparatus of a display panel according to a second exemplary embodiment.
Figure 7:
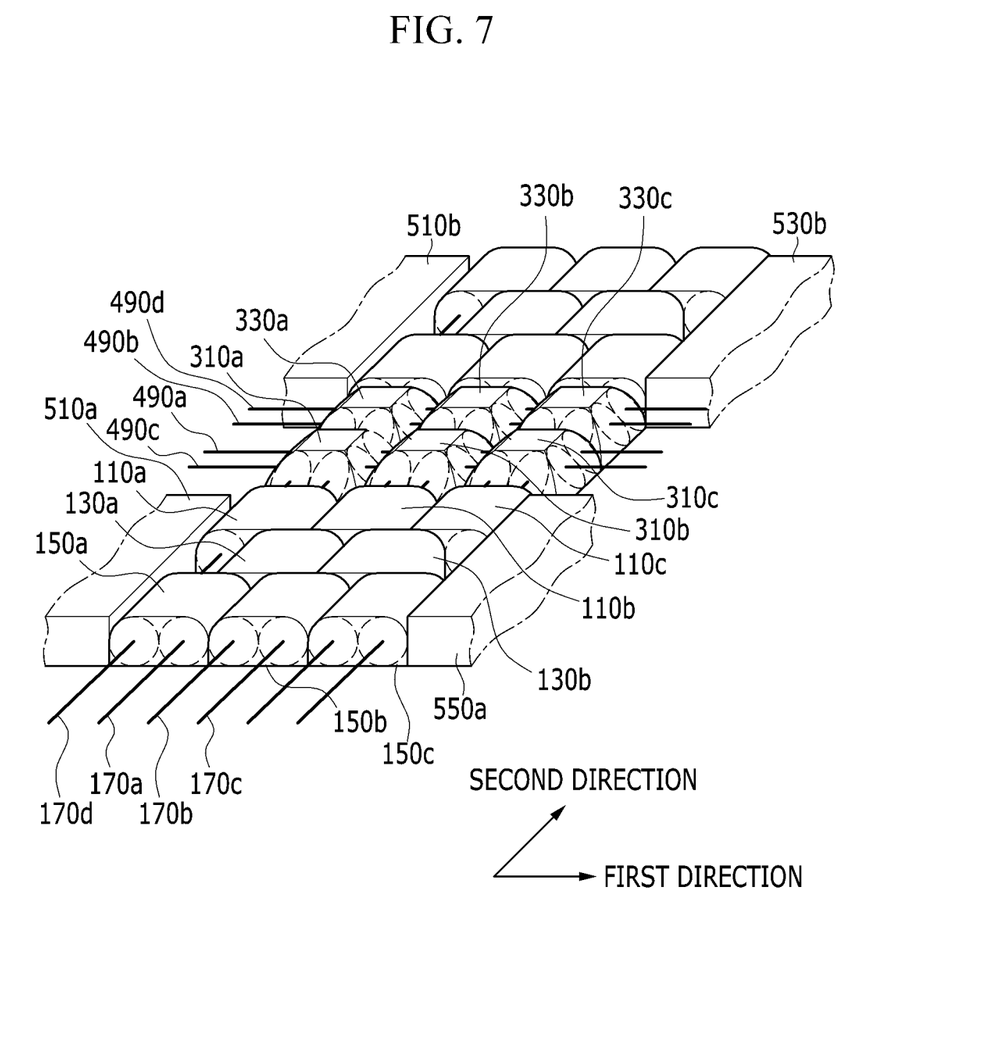
FIG. 7 is an enlarged perspective view of region B of FIG. 6.

Referring to FIGS. 6 and 7, an apparatus for supporting a display panel according to a second exemplary embodiment can bend or fold the display panel around a first direction and a second direction which is perpendicular to the first direction.

In contrast to the first exemplary embodiment, according to the second exemplary embodiment, the display panel can be bent or folded around the first and second directions, that is, in two different directions.

Referring to FIG. 6, according to the second exemplary embodiment, when the display panel is folded around the first direction and the second direction, it can be implemented by using the first to sixth unidirectional link members 110a, 110b, 110c, 150a, 150b, and 150c according to the first exemplary embodiment described above.

For example, when at least one of the first supporting plates 510a and 510b and the second supporting plates 530a and 530b is rotated around the second direction, the first to sixth unidirectional link members 110a, 110b, 110c, 150a, 150b, and 150c described above are interposed between the first and second supporting plates.

Here, the first supporting plates include a 1-1-th supporting plate 510a and a 1-2-th supporting plate 510b. The second supporting plates include a 2-1-th supporting plate 530a and a 2-2-th supporting plate 530b.

In addition, when at least one of the second supporting plates 530a and 530b and the third supporting plates 550a and 550b is rotated around the second direction, the first to sixth unidirectional link members 110a, 110b, 110c, 150a, 150b, and 150c described above are interposed between the second and third supporting plates. Here, the third supporting plates include a 3-1-th supporting plate 530a and a 3-2-th supporting plate 530b.

In addition, when at least one of the 1-1-th, 2-1-th, and 3-1-th supporting plates 510a, 530a, and 550a and the 1-2-th, 2-2-th, and 3-2-th supporting plates 510b, 530b, and 550b is rotated around the first direction, the first to sixth unidirectional link members 110a, 110b, 110c, 150a, 150b, and 150c described above are interposed between the 1-1-th, 2-1-th, and 3-1-th supporting plates 510a, 530a, and 550a and the 1-2-th, 2-2-th, and 3-2-th supporting plates 510b, 530b, and 550b.

However, in a region B of FIG. 6, a separate configuration is required at the region where the first and second directions intersect each other. Hereinafter, a configuration which can be rotated around the first and second directions as in the region B of FIG. 6 will be described in more detail.

Referring to FIG. 7, the first, second, and fifth bidirectional link members 310a, 310b, and 310c are arranged in the first direction so as to be parallel to each other. The first, second, and fifth bidirectional link members 310a, 310b, and 310c are connected to each other so as to be rotatable around the second direction.

In addition, the third, fourth, and sixth bidirectional link members 330a, 330b, and 330c are arranged in the first direction so as to be parallel to each other. The third, fourth, and sixth bidirectional link members 330a, 330b, and 330c are connected to each other so as to be rotatable around the second direction.

The first and third bidirectional link members 310a and 330a are arranged in the second direction so as to be parallel to each other. The first and third bidirectional link members 310a and 330a are connected to each other so as to be rotatable around the first direction.

In addition, the second and fourth bidirectional link members 310b and 330b are arranged in the second direction so as to be parallel to each other. The second and fourth bidirectional link members 310b and 330b are connected to each other so as to be rotatable around the first direction.

In addition, the fifth and sixth bidirectional link members 310c and 330c are arranged in the second direction so as to be parallel to each other. The fifth and sixth bidirectional link members 310c and 330c are connected to each other so as to be rotatable around the first direction.

Meanwhile, as shown in FIG. 7, the first, second, and fifth bidirectional link members 310a, 310b, and 310c are respectively connected to the first, second, and third unidirectional link members 110a, 110b, and 110c so as to be rotatable.

That is, the first bidirectional link member 310a and the first unidirectional link member 110a are connected to each other so as to be rotatable around the first direction. The first bidirectional link member 310a and the first unidirectional link member 110a are arranged in the second direction so as to be parallel to each other.

In addition, the second bidirectional link member 310b and the second unidirectional link member 110b are connected to each other so as to be rotatable around the first direction. In addition, the second bidirectional link member 310b and the second unidirectional link member 110b are arranged in the second direction so as to be parallel to each other.

In addition, the fifth bidirectional link member 310c and the third unidirectional link member 110c are connected to each other so as to be rotatable around the first direction. In addition, the fifth bidirectional link member 310c and the third unidirectional link member 110c are arranged in the second direction so as to be parallel to each other.

Hereinabove, an embodiment in which the first to sixth bidirectional link members 310a, 310b, 310c, 330a, 330b, and 330c are arranged in the region B of FIG. 6 has been described. However, in another embodiment in which only two unidirectional link members are arranged between the first and second supporting plates 510 and 530, only four bidirectional link members such as the first, second, third, and fourth bidirectional link members 310a, 310b, 330a, and 330b are included.

That is, the bidirectional link members can be included so as to correspond to the number of unidirectional link members interposed between the first and second supporting plates 510 and 530 described above.

Meanwhile, the first rotation axis 170a penetrates through the first and third bidirectional link members 310a and 330a. Thus, the first rotation axis 170a also penetrates through the first and fourth unidirectional link members 110a and 150a and the first connecting member 130a.

That is, as shown in FIG. 7, the first rotation axis 170a sequentially penetrates through the fourth unidirectional link member 140a, the first connecting member 130a, the first unidirectional link member 110a, the first bidirectional link member 310a, and the third bidirectional link member 330a.

In addition, the second rotation axis 170b penetrates through the second and fourth bidirectional link members 310b and 330b. In addition, the second rotation axis 170b also penetrates through the second and fifth unidirectional link members 110b and 150b and the first connecting member 130a.

That is, the second rotation axis 170b sequentially penetrates through the fifth unidirectional link member 150b, the first connecting member 130a, the second unidirectional link member 110b, the second bidirectional link member 310b, and the fourth bidirectional link member 330b.

In addition, the 2-1-th rotation axis 170c penetrates through the second and fourth bidirectional link members 310b and 330b. In addition, the 2-1-th rotation axis 170c penetrates through the second and fourth bidirectional link members 310b and 330b together with the second rotation axis 170b.

In this embodiment, the 2-1-th rotation axis 170c also penetrates through the second and fifth unidirectional link members 110b and 150b and the second connecting member 130b. The 2-1-th rotation axis 170c penetrates through the second and fifth unidirectional link members 110b and 150b together with the second rotation axis 170b.

That is, the 2-1-th rotation axis 170c sequentially penetrates through the fifth unidirectional link member 150b, the second connecting member 130b, the second unidirectional link member 110b, the second bidirectional link member 310b, and the fourth bidirectional link member 330b.

In addition, the 1-1-th rotation axis 170d penetrates through the first and third bidirectional link members 310a and 330a. The 1-1-th rotation axis 170d penetrates through the first and third bidirectional link members 310a and 330a together with the first rotation axis 170a.

The 1-1-th rotation axis 170d also penetrates through the first and fourth unidirectional link members 110a and 150a. The 1-1-th rotation axis 170d penetrates through the first and fourth unidirectional link members 110a and 150a together with the first rotation axis 170a.

That is, the 1-1-th rotation axis 170d sequentially penetrates through the fourth unidirectional link member 150a, the first unidirectional link member 110a, the first bidirectional link member 310a, and the third bidirectional link member 330a.

According to the second exemplary embodiment, a third rotation axis 490a penetrates through the first, second, and fifth bidirectional link members 310a, 310b, and 310c. The third rotation axis 490a is arranged so as to be parallel to the first direction.

In addition, a 3-1-th rotation axis 490c also penetrates through the first, second, and fifth bidirectional link members 310a, 310b, and 310c. That is, the 3-1-th rotation axis 490c penetrates through the first, second, and fifth bidirectional link members 310a, 310b, and 310c together with the third rotation axis 490a. The 3-1-th rotation axis 490c is arranged so as to be parallel to the third rotation axis 490a.

Further, a fourth rotation axis 490b penetrates through the third, fourth, and sixth bidirectional link members 330a, 330b, and 330c. The fourth rotation axis 490b is arranged so as to be parallel to the 3-1-th rotation axis 490c and the third rotation axis 490a.

In addition, a 4-1-th rotation axis 490d also penetrates through the third, fourth, and sixth bidirectional link members 330a, 330b, and 330c. That is, the 4-1-th rotation axis 490d penetrates through the third, fourth, and sixth bidirectional link members 330a, 330b, and 330c together with the fourth rotation axis 490b. The 4-1-th rotation axis 490d is arranged so as to be parallel to the fourth rotation axis 490b.

In the apparatus for supporting the display panel according to the second exemplary embodiment, similar unidirectional link members as the first, second, and third unidirectional link members are connected to the third, fourth, and sixth bidirectional link members 330a, 330b, and 330c. Since the unidirectional link members connected to the third, fourth, and sixth bidirectional link members 330a, 330b, and 330c are similar to the first, second, and third unidirectional link members, a detailed description thereof will be omitted.

Meanwhile, the unidirectional link members (not shown) can be connected to the first and third bidirectional link members 310a and 330a. That is, in FIG. 7, the unidirectional link members can be connected to left sides of the first and third bidirectional link members 310a and 330a.

In addition, the unidirectional link members (not shown) can also be connected to the fifth and sixth bidirectional link members 310c and 330c. That is, in FIG. 7, the unidirectional link members can be connected to right sides of the fifth and sixth bidirectional link members 310c and 330c.

Meanwhile, according to the second exemplary embodiment, the first to sixth bidirectional link members (310a, 310b, 310c, 330a, 330b, and 330c) can have a square pillar shape.

Figure 8:
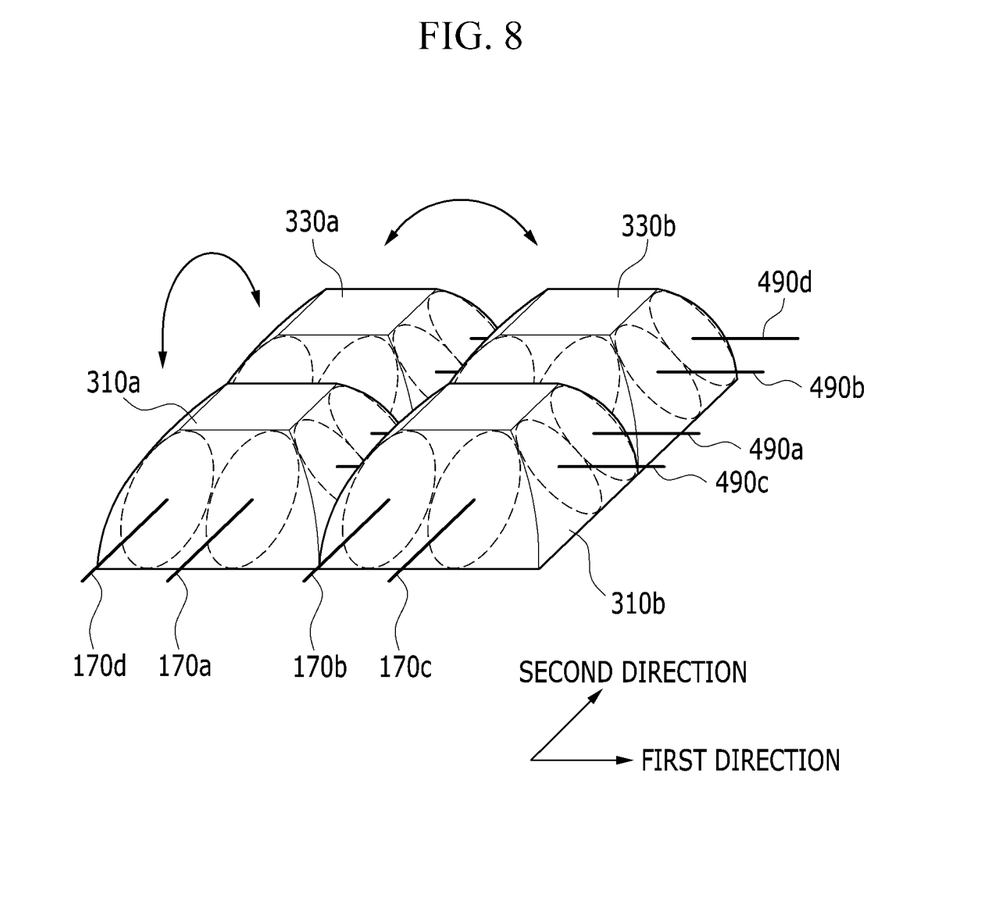
FIG. 8 is a drawing showing rotation directions of first and second bidirectional link members.

Referring to FIGS. 7 and 8, all of upper corner portions of the first to sixth bidirectional link members 310a, 310b, 310c, 330a, 330b, and 330c are formed to have a chamfered shape. Although the unidirectional link member according to the first exemplary embodiment has the two upper corner portions which are formed to have a chamfered shape, the bidirectional link member according to the second exemplary embodiment has the upper corner portions, that is, all of four corner portions, which are formed to have a chamfered shape.

Thereby, the first to sixth bidirectional link members 310a, 310b, 310c, 330a, 330b, and 330c can be rotated around the first direction and the second direction, that is, in two directions.

Figure 9:
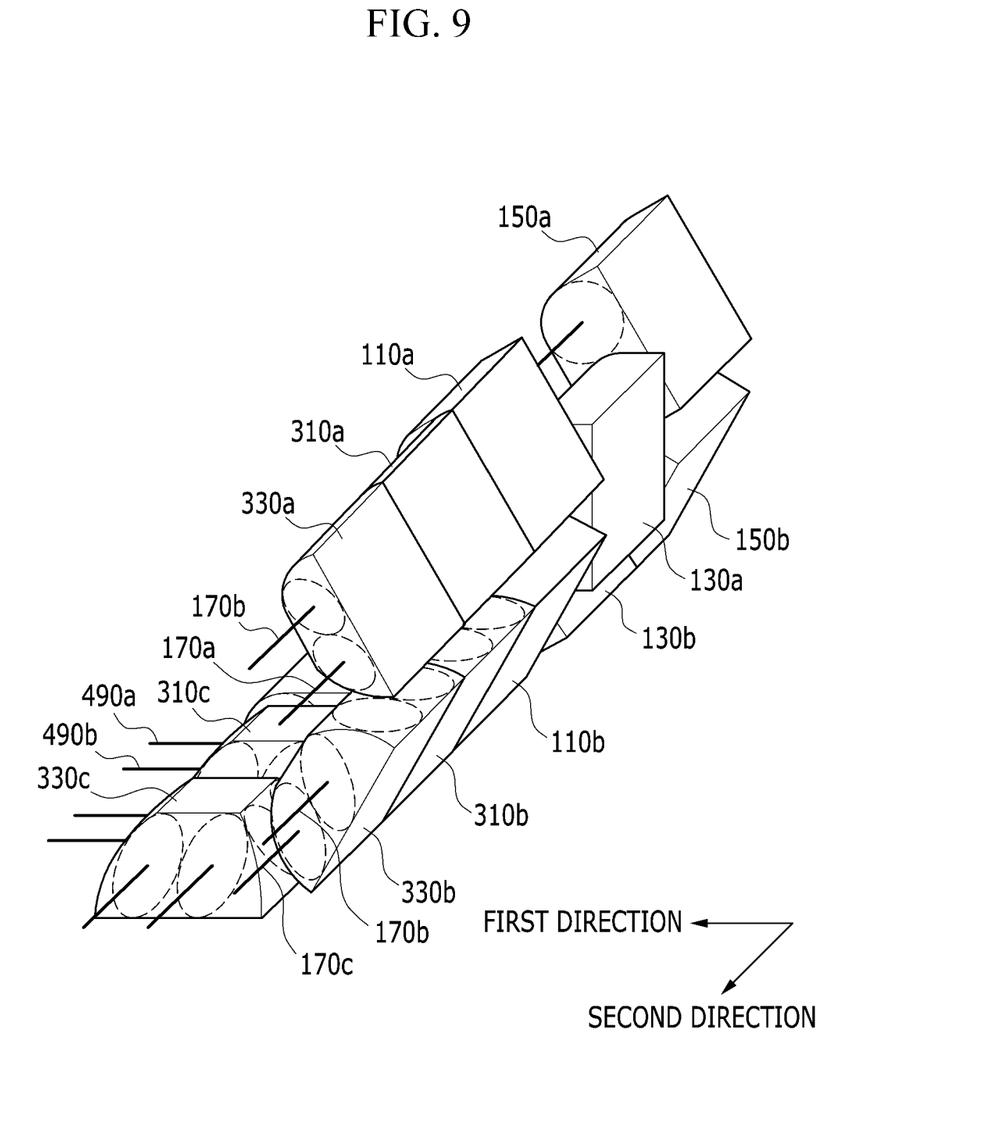
FIG. 9 is a drawing showing operations of the first and second bidirectional link members.

Referring to FIGS. 8 and 9, the first to sixth bidirectional link members 310a, 310b, 310c, 330a, 330b, and 330c can be rotated in only an upper direction based on a plane formed by the first to sixth bidirectional link members 310a, 310b, 310c, 330a, 330b, and 330c. That is, the first to sixth bidirectional link members 310a, 310b, 310c, 330a, 330b, and 330c cannot be rotated in a lower direction based on the plane.

Meanwhile, according to the second exemplary embodiment, the first to fourth rotation axes 170a, 170b, 490a, and 490b, the 1-1-th and 2-1-th rotation axes 170d and 170c, and the 3-1 and 4-1-th rotation axes 490c and 490d are elastic. Thus, in some embodiments, when the rotation axes are implemented as rotation rods or rotation pins, each of the rotation rods or rotation pins is elastic.

As shown in FIGS. 8 and 9, when the first to sixth bidirectional link members 310a, 310b, 310c, 330a, 330b, and 330c are rotated in the first direction or the second direction, the first to fourth rotation axes 170a, 170b, 490a, and 490b, the 1-1-th and 2-1-th rotation axes 170d and 170c, and the 3-1 and 4-1-th rotation axes 490c and 490d need to be bent. In addition, the first to sixth bidirectional link members 310a, 310b, 310c, 330a, 330b, and 330c are again returned to the original position.

To this end, the first to fourth rotation axes 170a, 170b, 490a, and 490b, the 1-1-th and 2-1-th rotation axes 170d and 170c, and the 3-1 and 4-1-th rotation axes 490c and 490d are elastic.

According to the first and second exemplary embodiments, the apparatus for supporting the display panel can support the display panel so as to be bent or folded around the first direction or the second direction.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A flexible display device, comprising:
    first and second unidirectional link members arranged in a first direction so as to be parallel to each other, wherein the first and second unidirectional link members are connected to each other so as to be rotatable around a second direction crossing the first direction;
    a first connecting member connected to one side of each of the first and second unidirectional link members so as to be rotatable around the second direction;
    first and second supporting plates arranged on opposing sides of the first and second unidirectional link members in the first direction, wherein the first and second supporting plates are configured to be rotatable together with the first and second unidirectional link members;
    first and second bidirectional link members arranged in the first direction so as to be parallel to each other, wherein the first and second bidirectional link members are connected to each other so as to be rotatable around the second direction;
    a first rotation rod penetrating through the first unidirectional link member and the first connecting member, wherein the first rotation rod is parallel to the second direction;
    a second rotation rod penetrating through the second unidirectional link member and the first connecting member, wherein the second rotation rod is parallel to the first rotation rod; and
    a flexible display panel,
    wherein the first and second supporting plates support the flexible display panel,
    wherein the flexible display panel is configured to be bent along with the rotation of the first and second supporting plates,
    wherein the first bidirectional link member and the first unidirectional link member are arranged in the second direction so as to be parallel to each other,
    wherein the first bidirectional link member and the first unidirectional link member are connected to each other so as to be rotatable around the first direction,
    wherein the second bidirectional link member and the second unidirectional link member are arranged in the second direction so as to be parallel to each other,
    wherein the second bidirectional link member and the second unidirectional link member are connected to each other so as to be rotatable around the first direction, and
    wherein the first rotation rod and the second rotation rod are elastic.

2. The flexible display device of claim 1, wherein the first and second unidirectional link members are connected to the first and second rotation rods so as to be rotatable around the first and second rotation rods.

3. The flexible display device of claim 2, wherein each of the first and second unidirectional link members has a rectangular prism shape and wherein two upper corner portions of each of the first and second unidirectional link members facing each other are chamfered.

4. The flexible display device of claim 3, wherein the corner portions of the first and second unidirectional link members contact each other when the first and second unidirectional link members are rotated around the first and second rotation rods.

5. The flexible display device of claim 1, wherein the first unidirectional link member is fixed to the first supporting plate.

6. The flexible display device of claim 5, wherein the second unidirectional link member is fixed to the second supporting plate.

7. The flexible display device of claim 1, further comprising:
    third and fourth bidirectional link members arranged in the first direction so as to be parallel to each other, wherein the third and fourth bidirectional link members are connected to each other so as to be rotatable around the second direction;
    wherein the first and third bidirectional link members are arranged in the second direction so as to be parallel to each other,
    wherein the first and third bidirectional link members are connected to each other so as to be rotatable around the first direction,
    wherein the second and fourth bidirectional link members are arranged in the second direction so as to be parallel to each other, and
    wherein the second and fourth bidirectional link members are connected to each other so as to be rotatable around the first direction.

8. The flexible display device of claim 7, wherein the first rotation rod penetrates through the first and third bidirectional link members, and wherein the second rotation rod penetrates through the second and fourth bidirectional link members.

9. The flexible display device of claim 8, further comprising:
    a third rotation rod penetrating through the first and second bidirectional link members, wherein the third rotation rod is parallel to the first direction; and
    a fourth rotation rod penetrating through the third and fourth bidirectional link members, wherein the fourth rotation rod is parallel to the third rotation rod.

10. The flexible display device of claim 9, wherein the first and second bidirectional link members are connected to each of the first and second rotation rods so as to be rotatable around the first and second rotation rods.

11. The flexible display device of claim 9, wherein the third and fourth bidirectional link members are connected to each of the first and second rotation rods so as to be rotatable around the first and second rotation rods.

12. The flexible display device of claim 9, wherein the first and third bidirectional link members are connected to each of the third and fourth rotation rods so as to be rotatable around the third and fourth rotation rods.

13. The flexible display device of claim 9, wherein the second and fourth bidirectional link members are connected to each of the third and fourth rotation rods so as to be rotatable around the third and fourth rotation rods.

14. The flexible display device of claim 9, wherein the first to fourth bidirectional link members are formed to have a rectangular prism shape and wherein each of upper corner portions of the first to fourth bidirectional link members is chamfered.

15. The flexible display device of claim 9, wherein the third and fourth rotation rods are elastic.

* * * * *